(12) United States Patent
Arnold et al.

(10) Patent No.: US 8,567,518 B2
(45) Date of Patent: Oct. 29, 2013

(54) AGRICULTURAL DEVICE MOVABLE BETWEEN A TRANSPORT POSITION AND A WORKING POSITION

(75) Inventors: Martin Arnold, Steinlah (DE); Cornelis Christianus Franciscus Havermans, Zevenbergen (NL)

(73) Assignee: Lely Patent N.V., Maassluis (NL)

( * ) Notice: Subject to any disclaimer, the term of this patent is extended or adjusted under 35 U.S.C. 154(b) by 0 days.

(21) Appl. No.: 13/490,471

(22) Filed: Jun. 7, 2012

(65) Prior Publication Data
US 2012/0256396 A1    Oct. 11, 2012

Related U.S. Application Data

(63) Continuation of application No. PCT/NL2010/000169, filed on Dec. 14, 2010.

(30) Foreign Application Priority Data

Dec. 16, 2009    (NL) ...................................... 1037561

(51) Int. Cl.
*A01D 78/10*    (2006.01)

(52) U.S. Cl.
USPC ........................................... 172/311; 56/377

(58) Field of Classification Search
CPC .................................................. A01B 73/067
USPC ............ 280/639, 656, 30, 400, 414.1, 415.1; 172/311, 456, 1, 448, 624.5, 626, 677, 172/679, 680, 683, 773, 775, 776; 56/6, 56/378, 379, 377; 37/234
See application file for complete search history.

(56) References Cited

U.S. PATENT DOCUMENTS

| | | | | | |
|---|---|---|---|---|---|
| 2,226,586 | A | * | 12/1940 | Seaholm | 172/240 |
| 2,338,698 | A | * | 1/1944 | White | 172/571 |
| 2,608,418 | A | * | 8/1952 | Finlayson et al. | 280/42 |

(Continued)

FOREIGN PATENT DOCUMENTS

| | | |
|---|---|---|
| AU | 1678076 | 3/1978 |
| EP | 0135180 | 3/1985 |
| WO | 8801470 | 3/1988 |

OTHER PUBLICATIONS

International Search Report of PCT/NL2010 issued on Mar. 28, 2011.

*Primary Examiner* — J. Allen Shriver, II
*Assistant Examiner* — Brodie Follman
(74) *Attorney, Agent, or Firm* — Hoyng Monegier LLP; Coraline J. Haitjema; David P. Owen

(57) ABSTRACT

An agricultural device is displaceable between a transport position and a working position and includes a frame having a main beam extending in a longitudinal direction, which main beam defines a longitudinal axis, and two side arms extending on both sides of the main beam to support one or more tools, wherein the side arms are hingeably connected at an inner end to a slide connection which is slidable along the main beam. The side arms are displaceable between a transport position, in which they substantially extend along the main beam, under a first angle with the main beam, and a working position, in which the side arms extend from the main beam under a second angle, larger than the first angle. The side arms are displaceable between the transport position and the working position by sliding of the slide connection along the main beam at that location.

4 Claims, 4 Drawing Sheets

(56) References Cited

U.S. PATENT DOCUMENTS

| | | | |
|---|---|---|---|
| 2,706,881 A * | 4/1955 | McDonald | 172/282 |
| 2,778,182 A * | 1/1957 | Malmgren | 172/311 |
| RE24,895 E * | 11/1960 | Clements | 280/639 |
| 3,376,937 A * | 4/1968 | Groberg | 172/780 |
| 3,493,247 A * | 2/1970 | Hornung et al. | 172/456 |
| 3,493,248 A * | 2/1970 | Tasset | 172/311 |
| 3,513,925 A * | 5/1970 | Figura | 180/208 |
| 3,521,905 A * | 7/1970 | Hornung et al. | 172/311 |
| 3,536,143 A * | 10/1970 | Hiebert | 172/311 |
| 3,608,643 A * | 9/1971 | Flood et al. | 172/197 |
| 3,620,550 A * | 11/1971 | Hornung | 172/311 |
| 3,791,673 A * | 2/1974 | Hornung | 172/311 |
| 3,810,660 A * | 5/1974 | Peterson | 172/272 |
| 3,979,133 A * | 9/1976 | Morris | 280/42 |
| 4,138,134 A * | 2/1979 | Lechler et al. | 172/311 |
| 4,211,287 A * | 7/1980 | Garrison | 172/311 |
| 4,223,743 A * | 9/1980 | Garrison | 172/583 |
| 4,236,585 A | 12/1980 | Adee | |
| 4,319,643 A * | 3/1982 | Carter et al. | 172/311 |
| 4,397,476 A * | 8/1983 | Bolyard et al. | 280/656 |
| 4,504,076 A | 3/1985 | Bedney | |
| 4,518,046 A * | 5/1985 | Rettig et al. | 172/311 |
| 4,586,724 A * | 5/1986 | Sargent et al. | 280/412 |
| 4,596,290 A * | 6/1986 | Bedney | 172/311 |
| 5,087,040 A * | 2/1992 | Wu | 280/646 |
| 5,113,956 A * | 5/1992 | Friesen et al. | 172/311 |
| 5,155,986 A * | 10/1992 | Kelderman | 56/365 |
| 5,305,590 A * | 4/1994 | Peeters | 56/377 |
| 5,398,771 A * | 3/1995 | Hornung et al. | 172/311 |
| 5,488,996 A * | 2/1996 | Barry et al. | 172/311 |
| 5,493,853 A * | 2/1996 | Tonutti | 56/377 |
| 5,542,190 A * | 8/1996 | Wahls | 33/624 |
| 5,598,691 A * | 2/1997 | Peeters | 56/377 |
| 5,647,440 A * | 7/1997 | Barry et al. | 172/311 |
| 5,685,135 A * | 11/1997 | Menichetti | 56/365 |
| 5,752,375 A * | 5/1998 | Tonutti | 56/365 |
| 5,787,988 A * | 8/1998 | Harlan et al. | 172/311 |
| 6,112,827 A * | 9/2000 | Reiber et al. | 172/311 |
| 6,192,994 B1 * | 2/2001 | Friggstad et al. | 172/311 |
| 6,314,710 B1 * | 11/2001 | Tonutti | 56/378 |
| 6,408,950 B1 * | 6/2002 | Shoup | 172/311 |
| 6,702,035 B1 * | 3/2004 | Friesen | 172/311 |
| 6,860,335 B2 * | 3/2005 | Arnett | 172/311 |
| 6,865,873 B2 * | 3/2005 | Menichetti | 56/367 |
| 6,902,010 B2 * | 6/2005 | Shoup | 172/456 |
| 6,945,024 B2 * | 9/2005 | Tonutti | 56/377 |
| 7,007,450 B2 * | 3/2006 | Tonutti | 56/377 |
| 7,028,919 B1 * | 4/2006 | Auer et al. | 239/168 |
| 7,313,904 B2 * | 1/2008 | Hruska et al. | 56/378 |
| 7,313,905 B2 * | 1/2008 | Vaske et al. | 56/379 |
| 7,469,648 B2 * | 12/2008 | Bettin | 111/52 |
| 7,604,068 B1 * | 10/2009 | Friesen | 172/311 |
| 7,640,873 B2 * | 1/2010 | Chiavario et al. | 111/57 |
| 7,712,544 B1 * | 5/2010 | Misenhelder et al. | 172/311 |
| 7,849,933 B2 * | 12/2010 | Marggi | 172/311 |
| 7,854,272 B2 * | 12/2010 | Friggstad et al. | 172/311 |
| 7,854,273 B2 * | 12/2010 | Friggstad et al. | 172/311 |
| 7,984,767 B2 * | 7/2011 | Friggstad et al. | 172/126 |
| 8,127,861 B2 * | 3/2012 | Meek | 172/311 |
| 8,235,133 B2 * | 8/2012 | Friggstad | 172/386 |
| 8,267,186 B2 * | 9/2012 | Kindley et al. | 172/311 |
| 2002/0069634 A1 * | 6/2002 | Tonutti | 56/378 |
| 2004/0012164 A1 * | 1/2004 | Kang | 280/47.26 |
| 2004/0083705 A1 * | 5/2004 | Tonutti | 56/377 |
| 2004/0093843 A1 * | 5/2004 | Tonutti | 56/377 |
| 2005/0076630 A1 * | 4/2005 | Tonutti | 56/378 |
| 2005/0087350 A1 * | 4/2005 | Bauer | 172/311 |
| 2005/0210856 A1 * | 9/2005 | Menichetti | 56/377 |
| 2006/0081163 A1 * | 4/2006 | Auer et al. | 111/130 |
| 2006/0090910 A1 * | 5/2006 | Houck | 172/272 |
| 2006/0185342 A1 * | 8/2006 | Hruska et al. | 56/378 |
| 2007/0033915 A1 * | 2/2007 | Vaske et al. | 56/378 |
| 2007/0062425 A1 * | 3/2007 | Auer et al. | 111/57 |
| 2007/0074499 A1 * | 4/2007 | Giovannini | 56/378 |
| 2007/0163224 A1 * | 7/2007 | Hruska et al. | 56/378 |
| 2007/0163791 A1 * | 7/2007 | Meek | 172/311 |
| 2008/0053351 A1 * | 3/2008 | Bettin | 111/52 |
| 2009/0101369 A1 * | 4/2009 | Marggi | 172/1 |
| 2009/0114406 A1 * | 5/2009 | Read | 172/1 |
| 2009/0145098 A1 * | 6/2009 | Tonutti | 56/377 |
| 2010/0084149 A1 * | 4/2010 | Kovach et al. | 172/396 |
| 2010/0101811 A1 * | 4/2010 | Friggstad et al. | 172/1 |
| 2010/0101812 A1 * | 4/2010 | Friggstad | 172/311 |
| 2010/0101813 A1 * | 4/2010 | Friggstad et al. | 172/311 |
| 2010/0126744 A1 * | 5/2010 | Poole | 172/311 |
| 2010/0314140 A1 * | 12/2010 | Kindley et al. | 172/1 |
| 2011/0017480 A1 * | 1/2011 | Thompson et al. | 172/1 |
| 2011/0284252 A1 * | 11/2011 | Friggstad et al. | 172/310 |
| 2013/0000268 A1 * | 1/2013 | Arnold et al. | 56/367 |

* cited by examiner

AGRICULTURAL DEVICE MOVABLE BETWEEN A TRANSPORT POSITION AND A WORKING POSITION

CROSS REFERENCE TO RELATED APPLICATIONS

This application is a continuation of PCT application number PCT/NL2010/000169 filed on 14 Dec. 2010, which claims priority from Netherlands application number 1037561 filed on 16 Dec. 2009. Both applications are hereby incorporated by reference in their entireties.

BACKGROUND OF THE INVENTION

1. Field of the Invention

The invention relates generally to a device for use in agriculture, and more particularly, to a frame to be moved by a tractor, on which frame a number of agricultural tools can be supported.

2. Description of the Related Art

Drawn agricultural devices provided with a central frame and side arms projecting therefrom on both sides thereof, on which side arms one or more crop processing tools are disposed, are known. The side arms are connected to the frame by means of hinges so as to be able to pivot between a rest position, in which they extend substantially parallel to each other, and one or more working positions, in which they extend sidewards.

BRIEF SUMMARY OF THE INVENTION

It is an object of the invention to provide an agricultural device having a frame having a main beam extending in a longitudinal direction, which main beam defines a longitudinal axis, and two side arms extending on both sides of the main beam to support one or more agricultural tools, which device can be brought into and out of the transport position in a favourable manner.

It is an object of the invention to provide an agricultural device having a frame having a main beam extending in a longitudinal direction, which main beam defines a longitudinal axis, and two side arms extending on both sides of the main beam to support one or more agricultural tools, wherein the device is movable between a transport position and a working positions, by means of which the distribution of the mass can be influenced in a favourable manner when switching between the working position and the transport position.

It is an object of the invention to provide an agricultural device having a frame having a main beam extending in a longitudinal direction, which main beam defines a longitudinal axis, and two side arms extending on both sides of the main beam to support one or more agricultural tools, wherein the device is movable between a transport position and a working position, which device has an improved driving behaviour in the transport position, drawn by a tractor, in particular with respect to rocking and/or swinging.

It is an object of the invention to provide an agricultural device having a frame having a main beam extending in a longitudinal direction, which main beam defines a longitudinal axis, and two side arms extending on both sides of the main beam to support one or more agricultural tools, wherein the device is movable between a transport position and a working position, which has an improved stability during transport behind a tractor.

According to various aspects of the present invention, the agricultural device comprises a frame having a main beam extending in a longitudinal direction, which main beam defines a longitudinal axis, and two side arms extending sidewards from the main beam on both sides thereof to support one or more tools, wherein the side arms are hingeably connected at an inner end to a slide connection which is slidable along the main beam, wherein the side arms are displaceable between a transport position, in which they substantially extend along the main beam, under a first angle with the main beam, and a working position, in which the side arms extend from the main beam, under a second angle, larger than the first angle, wherein the side arms are displaceable between the transport position and the working position by sliding of the slide connection along the main beam at that location. This results in a changed position of the inner ends of the side arms, and thus in a changed position of a large part of the mass, in particular if the side arms carry the tools.

In one embodiment, in which the device has a front end and a rear end, the slide connection is located closer to the front end in the transport position than in the working position. In the case of the above-mentioned known devices, in the transport position a relatively large part of the mass is carried by the support wheels instead of by the coupling to the tractor, as a result of which the agricultural device drawn by the tractor shows an instable behaviour, in particular may yaw around the coupling to the tractor during road transport. In this embodiment of the device according to the invention, when passing from the working position to the transport position, the mass can be brought further to the front end, where the coupling will be located, which enhances the stability during transport. In addition, this makes it possible to limit the length of the longitudinal beam.

In another embodiment according to the invention, the side arms and the main beam are interconnected at a distance from the slide connection by means of a respective holding rod which is hingeably connected at both ends to the respective side arm and the main beam. In this case, the ends of the holding rods are preferably stationary attached to the main beam when viewed in longitudinal direction. If the main beam is provided at a front end with means for coupling to a tractor, the inner ends of the holding rods and the coupling means can, in one embodiment, be mutually stationary when viewed in longitudinal direction.

Each side arm can be provided with a support wheel for supporting the side arm in the working position and in the transport position. In this case, said support wheel moves together with the side arm when the side arm moves between the working position and the transport position. In this case, the distance between the front end and the support wheel increases during the movement from the working position to the transport position when viewed in longitudinal direction. The possibilities of influencing the distribution of the mass are further increased if the coupling means and the two support wheels form the sole support points for the device in the transport position.

The invention further provides a device according to the invention wherein each of the side arms carries one or more tools.

The device according to the invention may be provided with means for coupling to a tractor, in particular in the region of a front end of the device.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
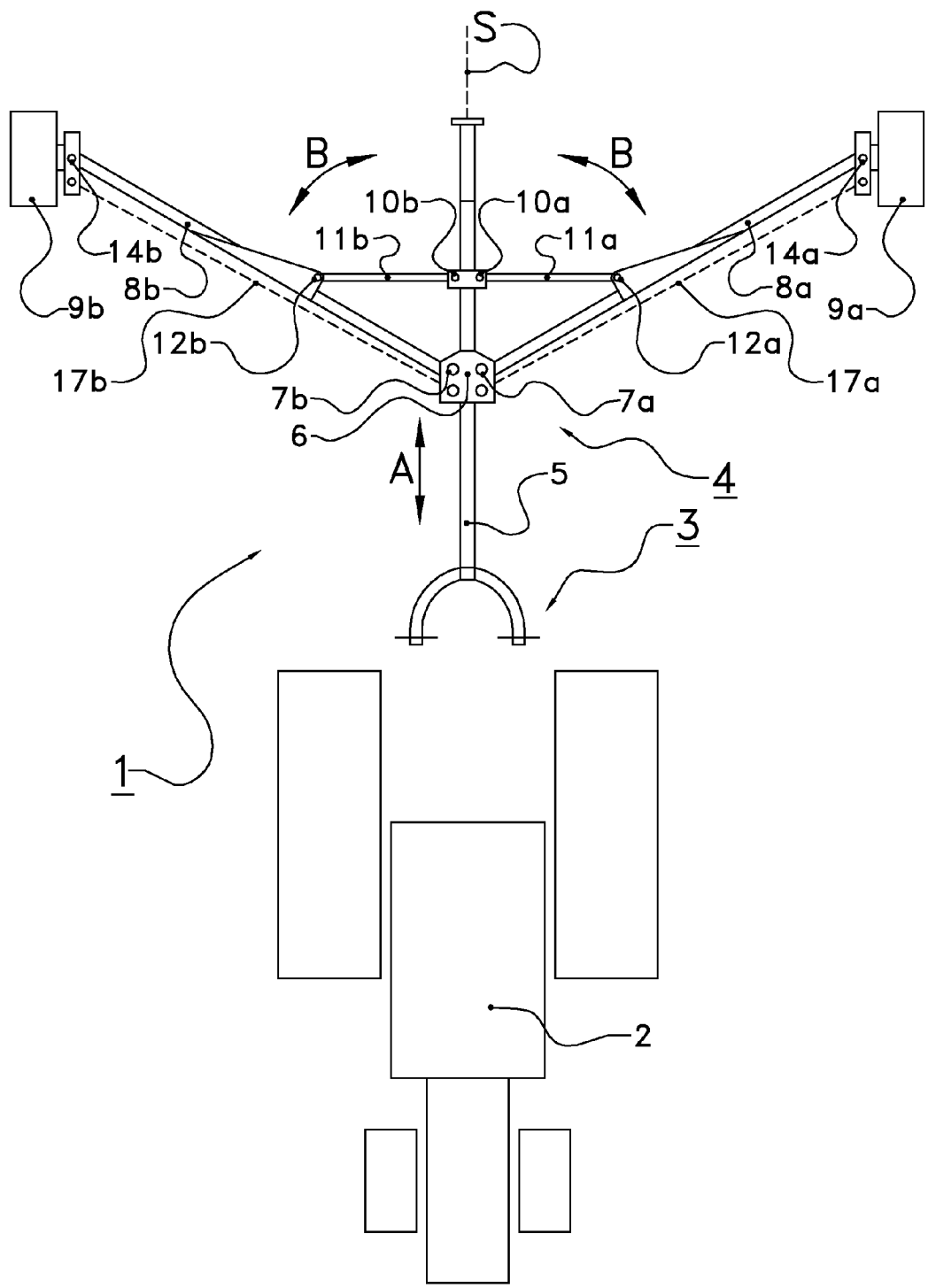
FIG. 1 is a top view of a device according to the invention, in a condition with a maximum working width.

The following is a description of certain embodiments of the invention, given by way of example only and with reference to the drawings. FIG. 1 shows an assembly 1 with a tractor 2 and a device 4 coupled thereto by means of a coupling 3, according to an example of the invention. The coupling is schematically shown and provides three degrees of rotation (X,Y,Z). The device 4 comprises a main beam 5 which defines a longitudinal axis S of the device. On the main beam 5 there is provided a slide 6 which is slidable over/along the main beam, parallel to the longitudinal axis S, see arrows A.

Figure 4:
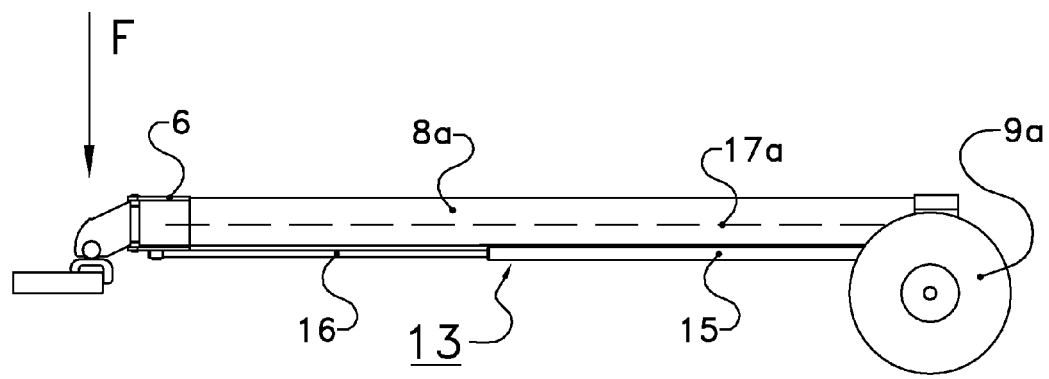
FIG. 4 is a side view of the device of FIG. 3.
Figure 5:
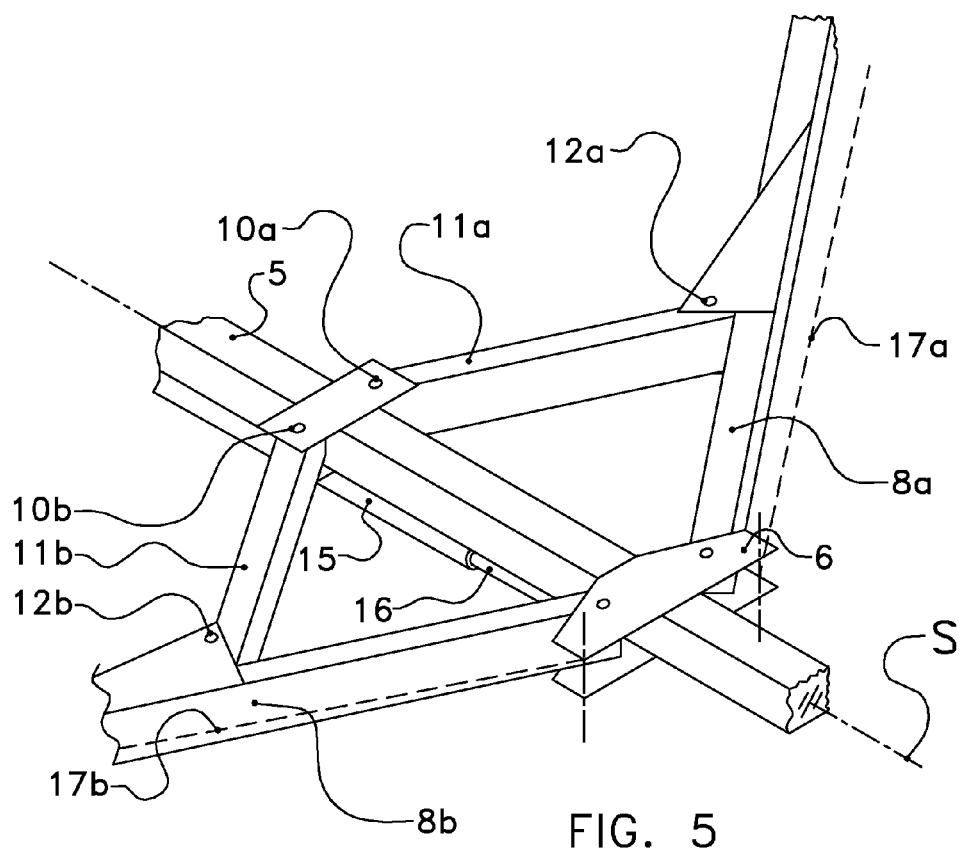
FIG. 5 is a detail of the device of the preceding figures.

On both sides of the main beam 5, the inner ends of side arms 8a,8b are hingeably connected to the slide 6 in the region of hinges 7a and 7b, so that the side arms 8a,8b can be pivoted in a horizontal plane, see arrows B. The side arms 8a,8b are adapted to carry not further shown agricultural tools, for example near the ends of the side arms, or somewhere along the length thereof. At the outer ends of the side arms 8a,b, there are provided support wheels 9a,b by means of which the side arms 8a,b are supported on a ground, field or road. The support wheels 9a,b are bearing-supported by means of shafts in swivel/hub assemblies 14a,b which are, parallel to the side arms 8a,b, connected to the slide 6 by means of aligning rods 17a,17b (schematically shown in FIGS. 4 and 5) provided on the ends of hinge connections.

At a location behind the slide 6, in the region of hinges 10a,10b, the inner ends of two holding rods 11a,11b are hingeably connected to the main beam 5. In the region of hinges 12a,12b, the outer ends of the two holding rods 11a,b are hingeably connected to the side arms 8a,b, at a distance from the hinges 7a,b, in this example at approximately ⅓ of the length of the side arms 8a,b. The hinges 10a,b are stationary on the main beam 5.

The holding rods 11a,b, the main beam 5 and the parts of the side arms 8a,b between the two hinges 7a and 12a, 7b and 12b define in each case a triangle of which the longitudinal side along the main beam is variable in length by moving the slide 6. For moving the slide 6 there is provided a cylinder 13, one end of which, in this example the end of the cylinder case 15 (FIGS. 4 and 5), is fixedly connected to the main beam 5, and whose other end, in this example the piston rod 16, is fastened to the slide 6. By non-shown, hydraulic or pneumatic, operation lines, capable of being activated from the tractor, the cylinder 13 can be operated to move the slide 6 forwards or rearwards along the main beam 5.

In the working position shown in FIG. 1, the side arms 8a,b are folded up to a maximum extent. The holding rods 11a,b extend transversely to the longitudinal axis S and the side arms 8a,b are at a rearwardly opening angle of approximately 65 degrees to the longitudinal axis S. In FIG. 1 there are further provided two aligning rods 17a, 17b which serve for aligning the support wheels 9a, 9b and which extend between the slide connection 6 and the respective support wheels 9a, 9b and substantially parallel to the respective side arms 8a, 8b which extend from the main beam 5. The slide connection 6, the aligning rods 17a, 17b and the hub assembly 14a, 14b form in each case a parallelogram arrangement for aligning the support wheels in a direction of travel. This will be explained in more detail with reference to FIG. 6.

Figure 2:
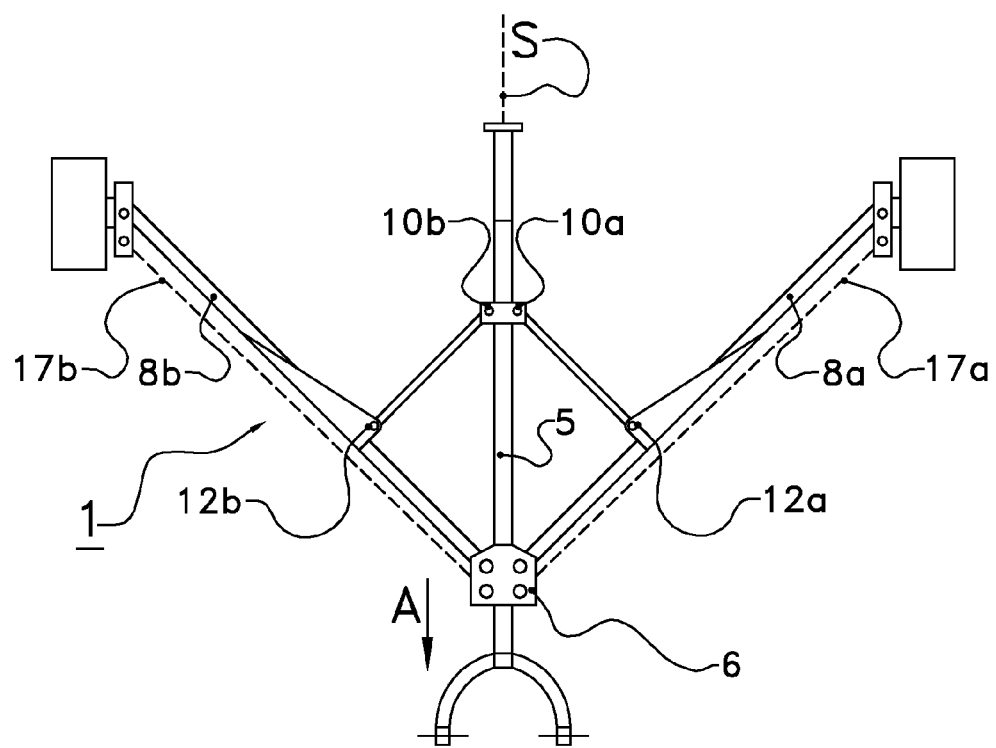
FIG. 2 is a top view of the device of FIG. 1, in a condition with a smaller working width.

FIG. 2 shows a narrower working position, in which the slide 6 is in a more forward position due to extension of cylinder 13, as a result of which the longitudinal sides of the aforementioned triangles are enlarged and the aforementioned angle is reduced to—in this case—45 degrees.

Figure 6:
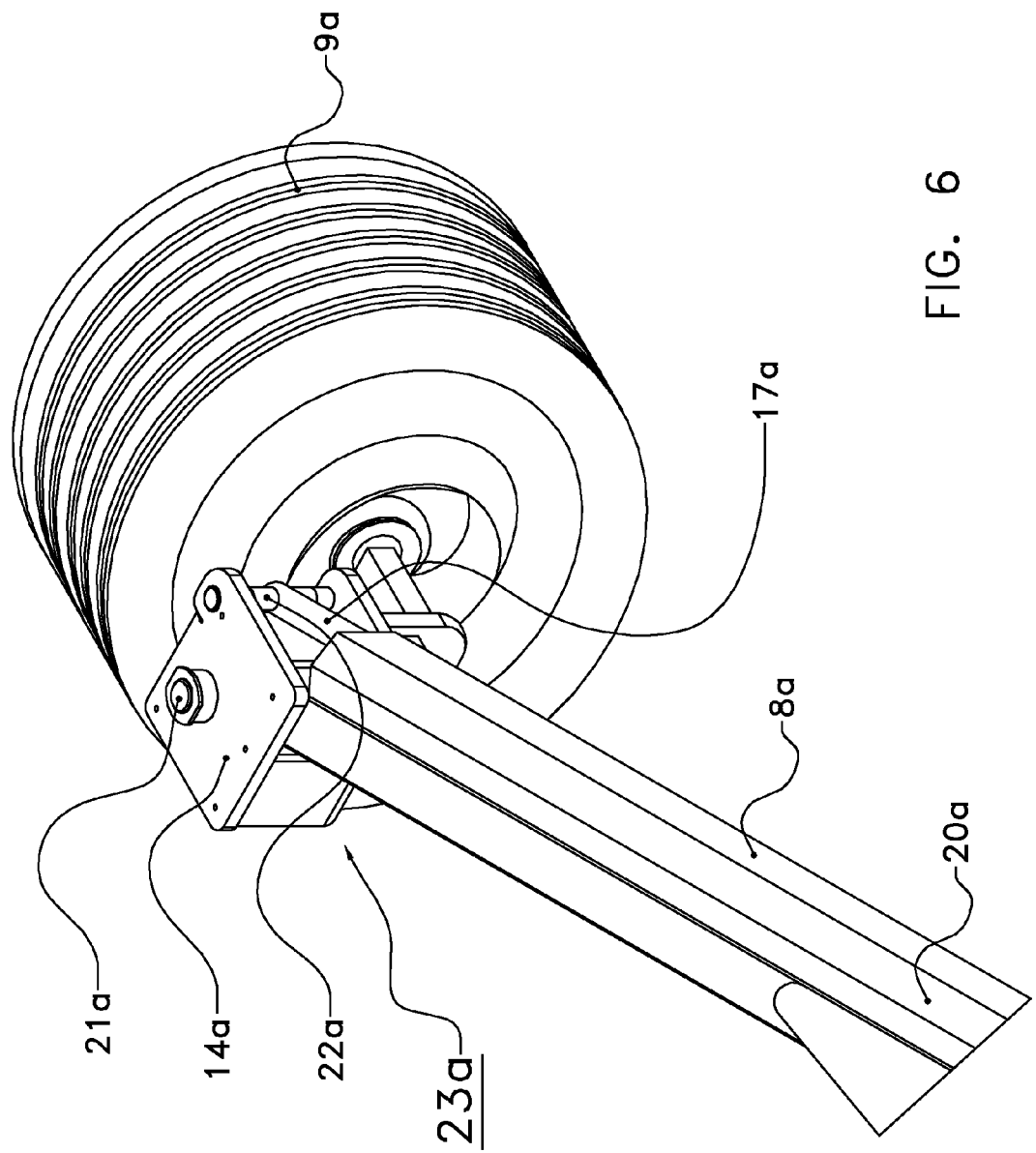
FIG. 6 is a detail of a hub and an aligning rod.

FIG. 6 shows in more detail the construction of one of the two hub holders 23a comprising the hub assembly 14a on which the support wheel 9a is pivotably bearing-supported around a first hinge pin 21a. FIG. 6 shows more in particular how aligning rod 17a is hingeably coupled to the hub assembly 14a by means of a second hinge pin 22a. As shown in FIG. 6 (and in FIGS. 1, 2 and 5), the aligning rod 17a extends along the front side of the side arm 8a, in this case partially screened by a hood 20a, to the hub holder 14a for the support wheel 9a. The hub holder 14a is hingeably connected to both the outer end of the side arm 8a, by means of the first hinge pin 21a, and to the outer end of the aligning rod 17a by means of the second hinge pin 22a, in such a manner that there is formed a parallelogram mechanism which is active in a horizontal plane and in which the hub holder and the slide form the short sides. The aligning rod 17a is slidably connected indirectly, by means of the slide 6, to the main beam 5, as well as the side arm 8a. It is pointed out that what has just been described with reference to FIG. 6 applies, of course, also to the construction which belongs to the other side arm 8b and the further components of the construction according to the invention which are connected thereto. Due to the parallelogram arrangement of aligning rods 17a,b, hubs 14a,b, side arms 8a,b and slide 6, the support wheels 9a,b remain oriented in the direction of travel. This appears, for example, from a comparison of the different positions of the assembly 1 shown in FIGS. 1, 2 and 3, in which it is clearly visible that the support wheels 9a, 9b occupy a parallel position with respect to the longitudinal axis S. It is also possible that the support wheels 9a, 9b, instead of occupying in each case a parallel position with respect to the longitudinal axis S during the opening and closing of the assembly 1, in particular the pivoting of the side arms 8a, 8b thereof, occupy a position which is not parallel to the longitudinal axis S. It is in particular possible that the support wheels 9a, 9b, during the opening by pivoting and closing by pivoting of the side arms 8a, 8b, can occupy a position which supports the pivoting movement, for example in the direction of the tractor 2. This is not further shown in the figures, but can for example be achieved by applying servo controls which respond to the command to pivot the side arms 8a, 8b.

Figure 3:
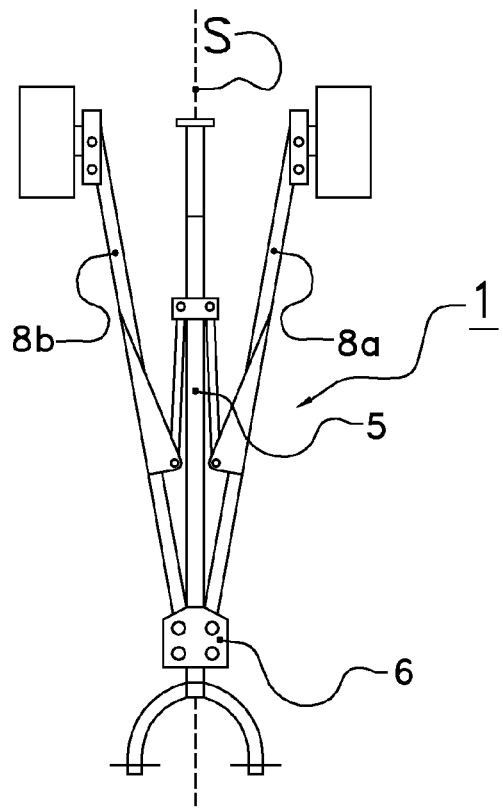
FIG. 3 is a top view of the device of FIGS. 1 and 2, in a transport position.

In FIG. 3, the cylinder 13 has been extended to a maximum extent and the slide 6 has been moved to immediately behind the coupling 3. The longitudinal sides of the aforementioned triangles now have their maximum lengths and the holding rods 11a,b are located along the main beam 5, the side arms 8a,b making a small angle of approximately 7 degrees with the longitudinal axis S. In this case, the inner ends of the side arms 8a,b have been brought closest possible to the coupling, as far as possible in front of the support wheels 9a,b, so that a large part of the weight thereof and of the tools carried by the side arms can be absorbed by the coupling 3/the tractor 2, see also FIG. 4. In this case, the sole support points of the device 4 are the support wheels 9a,b and the coupling 3 to the tractor 2.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A device comprising a frame having a main beam extending in a longitudinal direction, wherein the main beam defines a longitudinal axis, and two side arms extending on both sides of the main beam to support one or more agricultural tools, wherein the side arms are hingeably connected at an inner end of the side arms to a slide connection which is slidable along the main beam, wherein the side arms are displaceable between a transport position, in which they substantially extend along the main beam, under a first angle with the main beam, and a working position, in which the side arms extend from the main beam, under a second angle, larger than the first angle, wherein the side arms are displaceable between the transport position and the working position by sliding of the slide connection along the main beam at the location of the side arms, wherein the side arms and the main beam are interconnected at a distance from the slide connection by a respective holding rod that is hingeably connected at both ends to the respective side arm and the main beam, wherein the inner ends of the holding rods are stationary attached to the main beam when viewed in longitudinal direction, wherein the main beam is provided at the front end with a coupling to a tractor, wherein the inner ends of the holding rods and the coupling are mutually stationary when viewed in longitudinal direction, wherein each side arm is provided with a support wheel for supporting the side arm in the working position and in the transport position, and wherein the coupling and the two support wheels form the sole support points for the device in the transport position, and wherein each of the side arms carries one or more tools.

2. The device according to claim 1, wherein the device has a front end and a rear end, wherein the slide connection is located closer to the front end in the transport position than in the working position.

3. The device according to claim 1, wherein an aligning rod for aligning the support wheels extends between the slide connection and the respective support wheels and substantially parallel to the respective side arm which extends from the main beam.

4. The device according to claim 3, wherein the slide connection, the respective side arm, the aligning rod, and a hub assembly for a support wheel form in each case a parallelogram arrangement for aligning the support wheels in a direction of travel.

* * * * *